(12) United States Patent
Col et al.

(10) Patent No.: US 8,332,618 B2
(45) Date of Patent: Dec. 11, 2012

(54) OUT-OF-ORDER X86 MICROPROCESSOR WITH FAST SHIFT-BY-ZERO HANDLING

(75) Inventors: Gerard M. Col, Austin, TX (US); Matthew Daniel Day, Austin, TX (US); Terry Parks, Austin, TX (US); Bryan Wayne Pogor, Round Rock, TX (US)

(73) Assignee: VIA Technologies, Inc., New Taipei (TW)

( * ) Notice: Subject to any disclaimer, the term of this patent is extended or adjusted under 35 U.S.C. 154(b) by 630 days.

(21) Appl. No.: 12/634,187

(22) Filed: Dec. 9, 2009

(65) Prior Publication Data
US 2011/0035573 A1 Feb. 10, 2011

Related U.S. Application Data

(60) Provisional application No. 61/232,082, filed on Aug. 7, 2009.

(51) Int. Cl.
*G06F 9/315* (2006.01)
(52) U.S. Cl. .......................... 712/220; 712/219
(58) Field of Classification Search .................. None
See application file for complete search history.

(56) References Cited

U.S. PATENT DOCUMENTS

| | | | | |
|---|---|---|---|---|
| 5,497,493 | A * | 3/1996 | Colwell et al. | 712/23 |
| 6,463,522 | B1 * | 10/2002 | Akkary | 712/216 |
| 6,629,235 | B1 * | 9/2003 | Flachs et al. | 712/226 |
| 7,047,397 | B2 * | 5/2006 | Segelken | 712/221 |
| 8,069,339 | B2 * | 11/2011 | Henry et al. | 712/235 |
| 2002/0194458 | A1 * | 12/2002 | Soni | 712/227 |

* cited by examiner

*Primary Examiner* — Eric Coleman
(74) *Attorney, Agent, or Firm* — E. Alan Davis; James W. Huffman

(57) ABSTRACT

An out-of-order execution microprocessor includes a register alias table configured to generate a first indicator that indicates whether an instruction is dependent upon a condition code result of a shift instruction. The microprocessor also includes a first execution unit configured to execute the shift instruction and to generate a second indicator that indicates whether a shift amount of the shift instruction is zero. The microprocessor also includes a second execution unit configured to receive the first and second indicators and to generate a replay signal to cause the instruction to be replayed if the first indicator indicates the instruction is dependent upon the condition code result of the shift instruction and a second indicator indicates the shift amount of the shift instruction is zero.

24 Claims, 2 Drawing Sheets

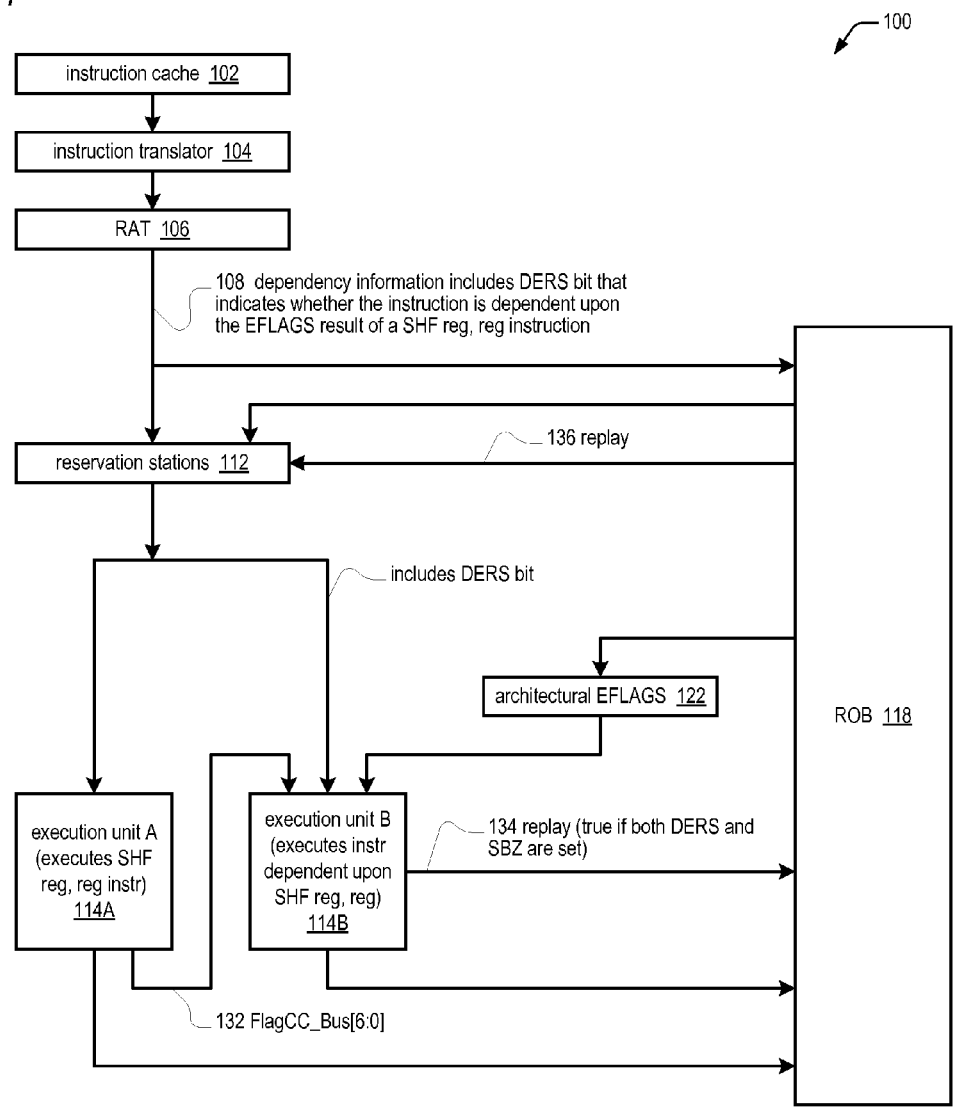

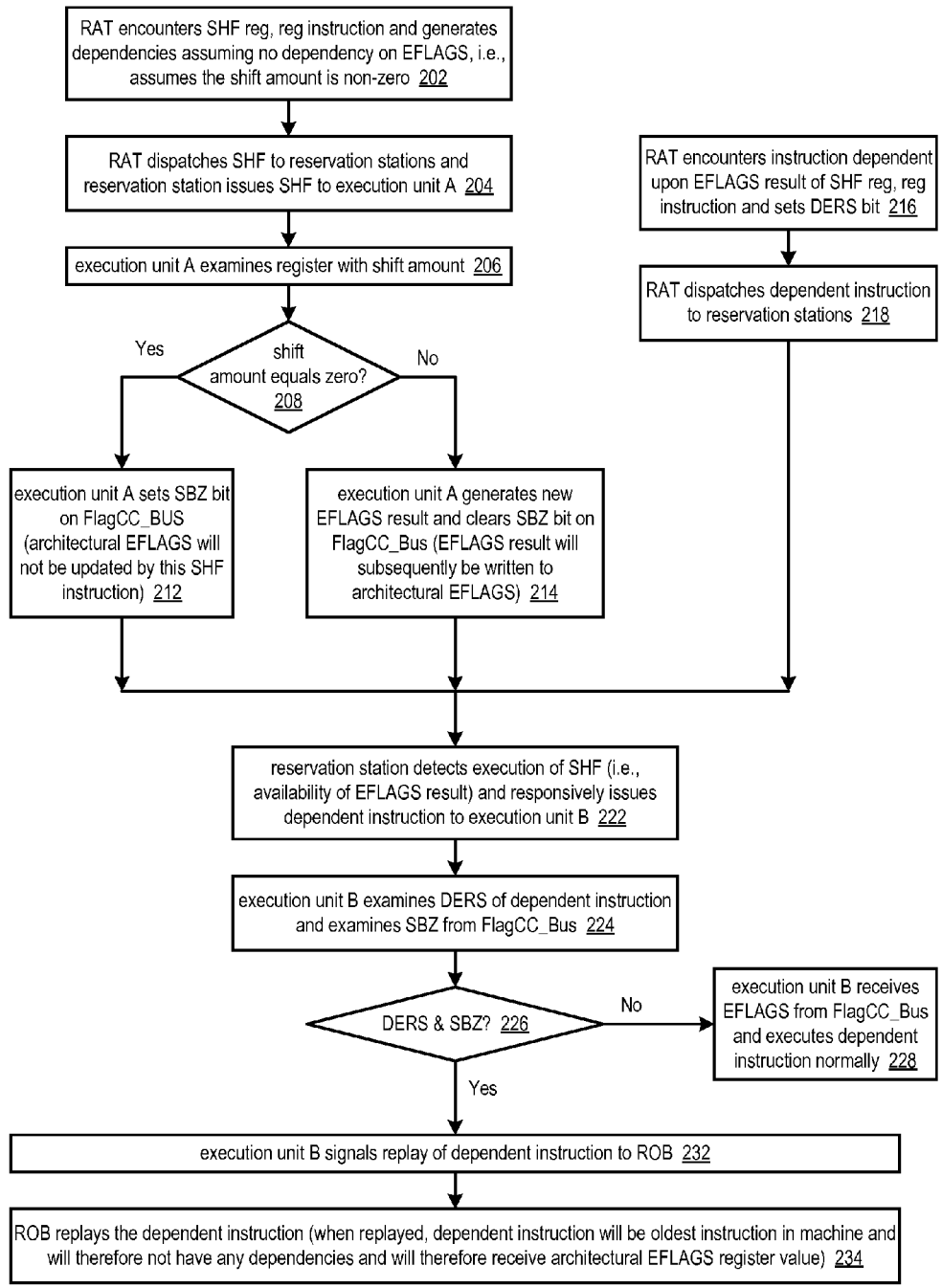

OUT-OF-ORDER X86 MICROPROCESSOR WITH FAST SHIFT-BY-ZERO HANDLING

CROSS REFERENCE TO RELATED APPLICATION(S)

This application claims priority based on U.S. Provisional Application Ser. No. 61/232,082, filed Aug. 7, 2009, entitled OUT-OF-ORDER X86 MICROPROCESSOR WITH FAST SHIFT-BY-ZERO HANDLING, which is hereby incorporated by reference in its entirety.

FIELD OF THE INVENTION

The present invention relates in general to the field of microprocessors with an out-of-order execution microarchitecture, and particularly with such a microprocessor having an x86 architecture.

BACKGROUND OF THE INVENTION

The x86 architecture defines that if an x86 Shift instruction (SHR or SHL, referred to generically as SHF) is by an amount of zero, the EFLAGS are unchanged; otherwise, the EFLAGS bits are updated to reflect the result of the shift operation. This poses a problem when determining dependencies of a Condition Code (CC) instruction (i.e., a reader of EFLAGS, such as Jcc/Setcc/Movcc) that follows an x86 SHF instruction. The following sequence exemplifies the problem:

| | |
|---|---|
| ADD EAX, EBX | ;writes EFLAGS |
| SHR EDX, CL | ;writes EFLAGS, only if shift amount (in CL) is non-zero |
| JZ <target> | ;uses EFLAGS |

If the value of CL is zero, then the JZ will be dependent upon the ADD; whereas, if the value of CL is non-zero, then the JZ will be dependent upon the SHR. Unfortunately, at the time the register alias table (RAT) determines the dependencies, it does not have any way of knowing whether the value of CL is zero or non-zero. Therefore, in older designs of a microprocessor:
  a) the RAT makes the JZ dependent upon the SHR, and
  b) the RAT makes the SHR dependent upon the ADD (i.e., upon the most recent older EFLAGS-modifying instruction).

This causes the SHR to receive the EFLAGS value from the ADD, which it needs because if the value in CL is zero, the SHR must supply to the JZ the EFLAGS value received from the ADD, since according to the x86 architecture definition the SHR does not modify EFLAGS if CL is zero. The present inventors have observed that the extra dependency of a SHF upon the most recent older EFLAGS-modifying instruction, which is only needed for the shift-by-zero case, is causing SHFs to be issued to the execution units later than necessary and hurting performance. (It is noted that the problem only occurs for SHFs of the form "SHF Reg, Reg", i.e., the shift amount is supplied from a register that is populated by an older instruction; whereas, for SHFs of the form "SHF Reg, Imm", the RAT can know early on from the Imm field whether the shift amount is zero and can set dependencies correctly at that time.)

BRIEF SUMMARY OF INVENTION

In one aspect the present invention provides an out-of-order execution microprocessor. The microprocessor includes a register alias table configured to generate a first indicator that indicates whether an instruction is dependent upon a condition code result of a shift instruction. The microprocessor also includes a first execution unit configured to execute the shift instruction and to generate a second indicator that indicates whether a shift amount of the shift instruction is zero. The microprocessor also includes a second execution unit configured to receive the first and second indicators and to generate a replay signal to cause the instruction to be replayed if the first indicator indicates the instruction is dependent upon the condition code result of the shift instruction and a second indicator indicates the shift amount of the shift instruction is zero.

In another aspect, the present invention provides a method for executing instructions in out-of-order execution microprocessor. The method includes generating a first indicator that indicates whether an instruction is dependent upon a condition code result of a shift instruction. The method also includes executing the shift instruction and generating a second indicator that indicates whether a shift amount of the shift instruction is zero. The method also includes receiving the first and second indicators and generating a replay signal to cause the instruction to be replayed if the first indicator indicates the instruction is dependent upon the condition code result of the shift instruction and a second indicator indicates the shift amount of the shift instruction is zero.

In yet another aspect, the present invention provides a computer program product for use with a computing device, the computer program product comprising a computer usable storage medium having computer readable program code embodied in the medium for specifying an out-of-order execution microprocessor. The computer readable program code includes first program code for specifying a register alias table configured to generate a first indicator that indicates whether an instruction is dependent upon a condition code result of a shift instruction. The computer readable program code also includes second program code for specifying a first execution unit configured to execute the shift instruction and to generate a second indicator that indicates whether a shift amount of the shift instruction is zero. The computer readable program code also includes third program code for specifying a second execution unit configured to receive the first and second indicators and to generate a replay signal to cause the instruction to be replayed if the first indicator indicates the instruction is dependent upon the condition code result of the shift instruction and a second indicator indicates the shift amount of the shift instruction is zero.

BRIEF DESCRIPTION OF THE DRAWINGS

FIG. 1 is a block diagram illustrating an out-of-order execution microprocessor according to an embodiment of the present invention.

FIG. 2 is a flowchart illustrating operation of the microprocessor of FIG. 1 according to the present invention.

DETAILED DESCRIPTION OF THE INVENTION

To solve the performance problem described above, the RAT always assumes the shift amount is not zero, since this is the common case, and does not cause a SHF instruction to have an EFLAGS dependency (i.e., upon the newest EFLAGS-modifying instruction that is older than the SHF). If the execution units later determine that the shift amount turns out to equal zero and there is an instruction that specifies a condition code as a source operand that is dependent upon the SHF instruction, the ROB replays the dependent instruction.

Referring now to FIG. 1, a block diagram illustrating an out-of-order execution microprocessor 100 according to an embodiment of the present invention is shown. The microprocessor 100 includes an instruction cache 102 for caching x86 instructions, such as SHF and instructions that use EFLAGS as a source operand (such as the JZ instruction in the example code sequence above) and instructions that update the EFLAGS (such as the ADD instruction in the example code sequence above). An instruction translator 104 selectively translates the x86 instructions into microinstructions that are provided to a register alias table (RAT) 106.

The RAT 106 generates dependencies for instructions. In particular, the RAT 106 is modified to keep track of instructions that are dependent on the EFLAGS result of a SHF Reg, Reg instruction and set a bit that is sent down with the dependent instruction to indicate the dependency, which is referred to as the DERS bit 108. The RAT 106 allocates an entry for each instruction in a reorder buffer (ROB) 118 and dispatches the instruction and its respective dependency information to reservation stations 112.

The reservation stations 112 issue instructions to the execution units 114 for execution when an instruction is ready for issuance, i.e., when its source operands are available and an appropriate execution unit 114 is available. In particular, the reservation station 112 provides the DERS bit 108 to the execution units 114 along with each instruction. When necessary, the ROB 118 generates a replay signal 136 to the reservation stations 112 to cause the necessary instructions to be replayed to the reservation stations 112, such as when an instruction is dependent upon a SHF with a shift value of zero as discussed in more detail below.

In the embodiment of FIG. 1, two execution units are shown, referred to as execution unit A 114A and execution unit B 114B. In the example of FIG. 1, execution unit A 114A executes SHF instructions, and execution unit B 114B executes instructions dependent upon SHF instructions. The execution units 114 are coupled by a 7-bit bus, FlagCC_Bus [6:0] 132, whose bits are defined as:

[6]: SBZ (Shift By Zero)
[5]: OF
[4]: SF
[3]: ZF
[2]: AF
[1]: PF
[0]: CF

As may be observed, bits [5:0] specify the common condition code bits of EFLAGS. Additionally, the FlagCC_Bus 132 includes an extra bit [6], the SBZ bit. Execution unit A 114A sets the SBZ bit to indicate that a SHF instruction has a shift value that is zero (e.g., in the example above, the CL register has a zero value). Execution unit A 114A forwards the common EFLAGS bit results and SBZ bit value of a SHF instruction to execution unit B 114B on the FlagCC_Bus 132. If execution unit B 114B executes an instruction with the DERS bit 108 set (i.e., dependent upon the SHF) and the SBZ bit is clear, then execution unit B 114B can use bits [5:0] to execute the instruction dependent upon the SHF; whereas, if the SBZ bit is set, execution unit B 114B asserts a replay signal 134 to the ROB 118 to communicate to the ROB 118 that the dependent instruction needs to be replayed. Execution unit B 114B also receives the architectural EFLAGS register 122 value in the case that the "dependent" instruction is not actually dependent upon the SHF instruction, such as will occur when the instruction is replayed.

Referring now to FIG. 2, a flowchart illustrating operation of the microprocessor 100 of FIG. 1 according to the present invention is shown. Flow begins at block 202.

At block 202, the RAT 106 encounters a SHF instruction and generates dependencies for it. Advantageously, and in contrast with older designs, the RAT 106 assumes that the SHF instruction does not have any dependency upon EFLAGS. That is, the RAT 106 assumes that the shift value is non-zero, thus the SHF instruction will generate a new EFLAGS value that it can supply to any dependent instruction without requiring the previous value of EFLAGS. As discussed herein, this is advantageous because it potentially enables the SHF instruction to be issued for execution sooner than if it has an EFLAGS dependency, thereby potentially improving throughput of the microprocessor 100. Flow proceeds to block 204.

At block 204, the RAT 106 dispatches the SHF instruction to a reservation station 112. The reservation station 112 subsequently issues the SHF instruction to execution unit A 114A. Flow proceeds to block 206.

At block 206, execution unit A 114A examines the register containing the shift amount (in the example above, the CL register contains the shift amount). Flow proceeds to decision block 208.

At decision block 208, if execution unit A 114A determines that the shift amount is zero, flow proceeds to block 212; otherwise, flow proceeds to block 214.

At block 212, execution unit A 114A sets the SBZ bit on the FlagCC_Bus 132. To satisfy the x86 architecture requirement, when the ROB 118 retires the SHF instruction, it notes that it was a shift by zero and refrains from updating the EFLAGS register. Flow proceeds to block 222.

At block 214, execution unit A 114A clears the SBZ bit on the FlagCC_Bus 132 and generates the new EFLAGS result based on the shift operation specified by the SHF instruction. The EFLAGS result will subsequently be written to the architectural EFLAGS register 122. Flow proceeds to block 222.

At block 216, the RAT 106 encounters an instruction that specifies EFLAGS as a source operand, such as the JZ instruction in the example above. If the instruction is dependent upon the EFLAGS result of an older SHF instruction, the RAT 106 sets the DERS bit 108 associated with the dependent instruction. Flow proceeds to block 218.

At block 218, the RAT 106 dispatches the dependent instruction to a reservation station 112. It is noted that the steps at blocks 216 and 218 are performed by the microprocessor 100 either simultaneous with or subsequent to the steps performed at blocks 202 and 204. That is, the RAT 106 is capable of receiving and dispatching multiple instructions per clock cycle, and although the SHF instruction precedes the dependent instruction in program order, the RAT 106 may process them in the same clock cycle. Flow proceeds from block 218 to block 222.

At block 222, the reservation station 112 holding the dependent instruction detects the execution of the SHF instruction, i.e., that the EFLAGS result of the SHF instruction is available, and responsively issues the dependent instruction to execution unit B 114B. Flow proceeds to block 224.

At block 224, execution unit B 114B executes the dependent instruction. Flow proceeds to decision block 226.

At decision block 226, as part of the execution of the dependent instruction, execution unit B 114B determines whether both the DERS bit 108 associated with the dependent instruction is set and the SBZ bit generated by execution unit A 114A at block 212 is set. If both bits are set, flow proceeds to block 232; otherwise, flow proceeds to block 228.

At block 228, execution unit B 114B receives the common EFLAGS bits, which were generated at block 212 during the execution of the SHF instruction, from the FlagCC_Bus 132 and executes the dependent instruction normally. The ROB 118 subsequently retires the dependent instruction normally. Flow ends at block 228.

At block 232, execution unit B 114B asserts the replay signal 134 to communicate to the ROB 118 that the dependent instruction needs to be replayed, which the ROB 118 notes in the entry allocated to the dependent instruction. Flow proceeds to block 234.

At block 234, the ROB 118 replays the dependent instruction. That is, when the dependent instruction becomes the oldest instruction in the microprocessor 100 such that it is ready to retire, the ROB 118 replays all unretired instructions therein starting from the dependent instruction. This is necessary because the SHF instruction cannot supply the proper EFLAGS value to the dependent instruction, since the RAT 106 assumed at block 202 that the SHF instruction was a non-zero shift value instruction. This is a tradeoff the microprocessor 100 makes in exchange for the improved performance potentially gained by eliminating the dependency of the SHF instruction upon EFLAGS. It is noted that when the dependent instruction is replayed, it will be the oldest instruction in the machine—thus its DERS bit will be clear, so it will not have any dependencies and will simply receive the condition codes from the architectural EFLAGS register. Flow ends at block 234.

In one embodiment, the reservation stations 112 may issue the SHF instruction to one of multiple execution units. Furthermore, although FIG. 1 shows only execution unit A outputting to the FlagCC_Bus 132, each of the execution units that execute instructions that affects EFLAGS outputs to the FlagCC_Bus 132, and each execution unit that can execute instructions dependent upon EFLAGS receives the FlagCC_Bus 132 as an input.

For a relatively modest amount of additional hardware and a potential replay penalty that occurs infrequently, the microprocessor is able to eliminate the dependency of the SHF upon an older EFLAGS-modifying instruction, which in most instruction mixes improves throughput and utilization in a superscalar out-of-order microarchitecture.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An out-of-order execution microprocessor, comprising:
a register alias table, configured to generate a first indicator that indicates whether an instruction is dependent upon a condition code result of a shift instruction;
a first execution unit, configured to execute the shift instruction and to generate a second indicator that indicates whether a shift amount of the shift instruction is zero; and
a second execution unit, configured to receive the first and second indicators and to generate a replay signal to cause the instruction to be replayed if the first indicator indicates the instruction is dependent upon the condition code result of the shift instruction and a second indicator indicates the shift amount of the shift instruction is zero.

2. The microprocessor of claim 1, wherein the condition code result comprises an x86 architecture EFLAGS result.

3. The microprocessor of claim 1, wherein the shift instruction comprises an x86 architecture shift instruction.

4. The microprocessor of claim 3, wherein the register alias table is configured to generate dependencies for the x86 architecture shift instruction assuming the shift amount is non-zero.

5. The microprocessor of claim 1, wherein the first execution unit being configured to execute the shift instruction comprises being configured to generate the condition code result of the shift instruction, wherein the second execution unit is configured to use the condition code result generated by the first execution unit to execute the dependent instruction if the second indicator indicates the shift amount of the shift instruction is non-zero.

6. The microprocessor of claim 1, wherein upon being replayed, the second execution unit is configured to receive the condition code result to execute the instruction from an architectural condition code register of the microprocessor.

7. The microprocessor of claim 1, wherein the register alias table is configured to generate dependencies for the shift instruction assuming the shift instruction has no condition code result dependencies on older instructions.

8. A method for executing instructions in out-of-order execution microprocessor, the method comprising:
generating a first indicator that indicates whether an instruction is dependent upon a condition code result of a shift instruction;
executing the shift instruction and generating a second indicator that indicates whether a shift amount of the shift instruction is zero; and
receiving the first and second indicators and generating a replay signal to cause the instruction to be replayed if the first indicator indicates the instruction is dependent upon the condition code result of the shift instruction and a second indicator indicates the shift amount of the shift instruction is zero.

9. The method of claim 8, wherein the condition code result comprises an x86 architecture EFLAGS result.

10. The method of claim 8, wherein the shift instruction comprises an x86 architecture shift instruction.

11. The method of claim 10, further comprising:
generating dependencies for the x86 architecture shift instruction assuming the shift amount is non-zero.

12. The method of claim 8, further comprising:
executing the dependent instruction using the condition code result of the shift instruction if the second indicator indicates the shift amount of the shift instruction is non-zero.

13. The method of claim 8, further comprising:
replaying the instruction, after said generating the replay signal, wherein said replaying the instruction comprises receiving the condition code result from an architectural condition code register of the microprocessor.

14. The method of claim 8, further comprising:
generating dependencies for the shift instruction assuming the shift instruction has no condition code result dependencies on older instructions.

15. The method of claim 8, wherein said generating the first indicator is performed by a register alias table of the microprocessor.

16. The method of claim 8, wherein said executing the shift instruction is performed by a first execution unit of the microprocessor.

17. The method of claim 8, wherein said receiving the first and second indicators and said generating the replay signal are performed by a second execution unit of the microprocessor.

18. A computer program product for use with a computing device, the computer program product comprising:
a non-transitory computer usable storage medium, having computer readable program code embodied in said medium, for specifying an out-of-order execution microprocessor, the computer readable program code comprising:
first program code for specifying a register alias table, configured to generate a first indicator that indicates whether an instruction is dependent upon a condition code result of a shift instruction;
second program code for specifying a first execution unit, configured to execute the shift instruction and to generate a second indicator that indicates whether a shift amount of the shift instruction is zero; and
third program code for specifying a second execution unit, configured to receive the first and second indicators and to generate a replay signal to cause the instruction to be replayed if the first indicator indicates the instruction is dependent upon the condition code result of the shift instruction and a second indicator indicates the shift amount of the shift instruction is zero.

19. The computer program product for use with a computing device of claim 18, wherein the condition code result comprises an x86 architecture EFLAGS result.

20. The computer program product for use with a computing device of claim 18, wherein the shift instruction comprises an x86 architecture shift instruction.

21. The computer program product for use with a computing device of claim 20, wherein the register alias table is configured to generate dependencies for the x86 architecture shift instruction assuming the shift amount is non-zero.

22. The computer program product for use with a computing device of claim 18, wherein the first execution unit being configured to execute the shift instruction comprises being configured to generate the condition code result of the shift instruction, wherein the second execution unit is configured to use the condition code result generated by the first execution unit to execute the dependent instruction if the second indicator indicates the shift amount of the shift instruction is non-zero.

23. The computer program product for use with a computing device of claim 18, wherein upon being replayed, the second execution unit is configured to receive the condition code result to execute the instruction from an architectural condition code register of the microprocessor.

24. The computer program product for use with a computing device of claim 18, wherein the register alias table is configured to generate dependencies for the shift instruction assuming the shift instruction has no condition code result dependencies on older instructions.

* * * * *